(12) United States Patent  
Wu

(10) Patent No.: US 8,168,316 B2  
(45) Date of Patent: May 1, 2012

(54) FRAME STRUCTURE FOR COLLECTING A PLURALITY OF BATTERIES

(75) Inventor: Donald P. H. Wu, Sinfong Township Hsinchu County (TW)

(73) Assignee: Energy Control Limited, Tortola (VG)

( * ) Notice: Subject to any disclaimer, the term of this patent is extended or adjusted under 35 U.S.C. 154(b) by 1241 days.

(21) Appl. No.: 11/868,519

(22) Filed: Oct. 7, 2007

(65) Prior Publication Data

US 2009/0092890 A1    Apr. 9, 2009

(51) Int. Cl.
*H01M 2/04* (2006.01)
*H01M 2/10* (2006.01)

(52) U.S. Cl. ............................. 429/99; 429/151; 429/177

(58) Field of Classification Search ............ 429/97–100, 429/151, 159, 163, 176, 177
See application file for complete search history.

(56) References Cited

U.S. PATENT DOCUMENTS

| | | | | |
|---|---|---|---|---|
| 5,308,717 | A * | 5/1994 | Gordin | 429/99 |
| 6,224,998 | B1 * | 5/2001 | Brouns et al. | 429/100 |
| 6,410,185 | B1 * | 6/2002 | Takahashi et al. | 429/163 |
| 6,617,973 | B1 * | 9/2003 | Osterman | 340/636.1 |
| 6,773,846 | B2 * | 8/2004 | Chen et al. | 429/97 |

* cited by examiner

*Primary Examiner* — Tracy Dove

(57) ABSTRACT

A frame structure for collecting a plurality of batteries comprises a cover covers one end surface of the batteries with positive and negative terminals, and the positive and negative terminals of the batteries are protruded out of the cover. A base is provided for collecting the batteries. A plurality of jointing structures is inserted through both sides of the cover and the base. Such arrangements not only is portable and easy to disassemble, but also is environmental protection.

4 Claims, 5 Drawing Sheets

FRAME STRUCTURE FOR COLLECTING A PLURALITY OF BATTERIES

BACKGROUND OF THE INVENTION

1. Field of the Invention

The present invention relates to a frame structure for collecting a plurality of batteries, and more particularly to a frame structure for collecting a plurality of batteries, which not only is portable and easy to disassemble, but also is environmental protection by utilizing a cover and a base cooperated with a plurality of jointing structures to collect the batteries.

2. Description of the Prior Art

A cooling method of a battery assembly for an assembled storage battery is disclosed in TW Pat. serial number 086114147, the storage battery is assembled by utilizing an aluminum plate and an iron belt to make the batteries apposed. In addition, both sides of the battery assembly are disposed with a plate, respectively, and a belt is disposed between the plates and wraps the long sides of the batteries. And the batteries are disposed transversely, and the terminals of each battery face towards the same direction.

However, such a conventional battery assembly has the following disadvantages:

Firstly, the terminals of the transversely disposed batteries face towards the same direction and are not added with anti-leakage structures, so the conventional battery assembly is insecure.

Secondly, the batteries are bound by the belt, and the batteries located at the center of the battery assembly are likely to be separated from the battery assembly, so the conventional battery assembly is difficult to carry.

Thirdly, the batteries are wrapped by the aluminum plate and the iron belt, and the aluminum plate and the iron belt must be destroyed when the user replaces the batteries, so the batteries of the conventional battery assembly are difficult to replace.

The present invention has arisen to mitigate and/or obviate the afore-described disadvantages.

SUMMARY OF THE INVENTION

The primary objective of the present invention is to provide a frame structure for collecting a plurality of batteries, which not only is portable and easy to disassemble, but also is environmental protection.

The frame structure for collecting a plurality of batteries comprises a base for collecting the batteries. A cover covers one end surface of the batteries with positive and negative terminals, and the positive and negative terminals of the batteries are protruded out of one end of the cover. And a plurality of jointing structures is inserted through both sides of the base and the cover. The base cooperates with the cover to collect the batteries, and the jointing structures are inserted through both sides of the base and the cover, such that the present invention not only is portable and easy to disassemble, but also is environmental protection.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
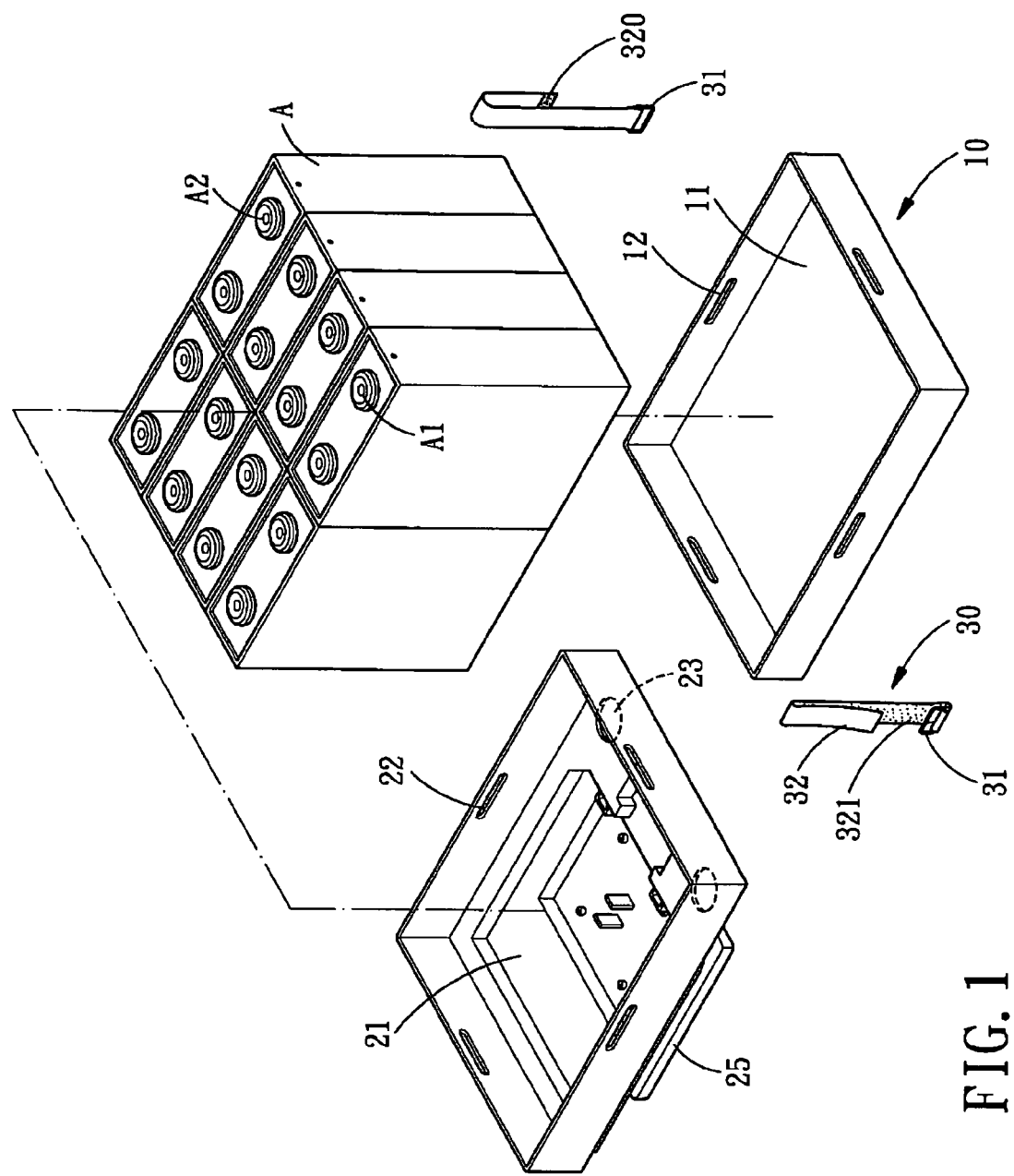
FIG. 1 is an exploded view of a frame structure for collecting a plurality of batteries in accordance with the present invention.
Figure 2:
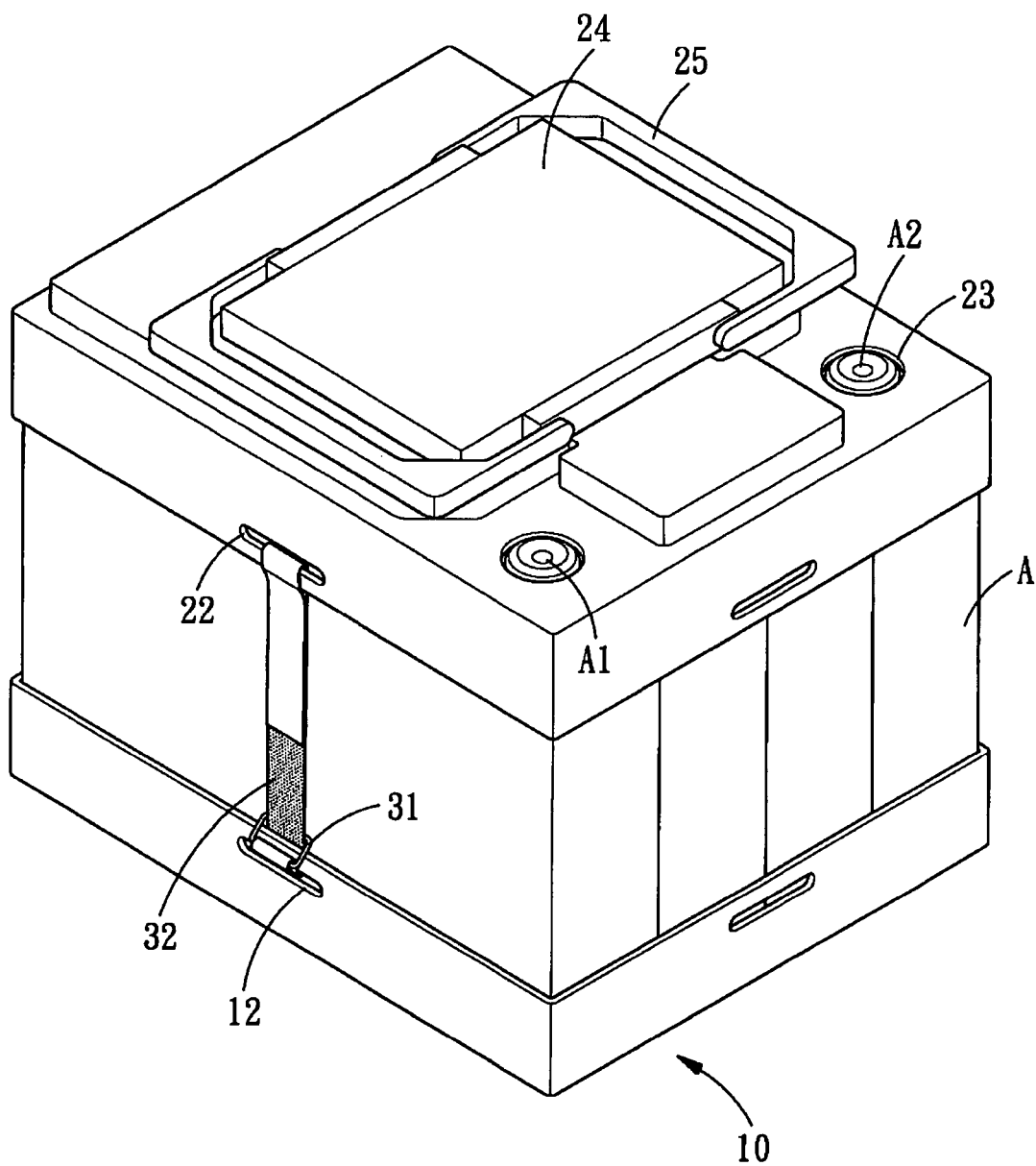
FIG. 2 is an illustrative view showing the frame structure for collecting a plurality of batteries in accordance with a first embodiment of the present invention.
Figure 3:
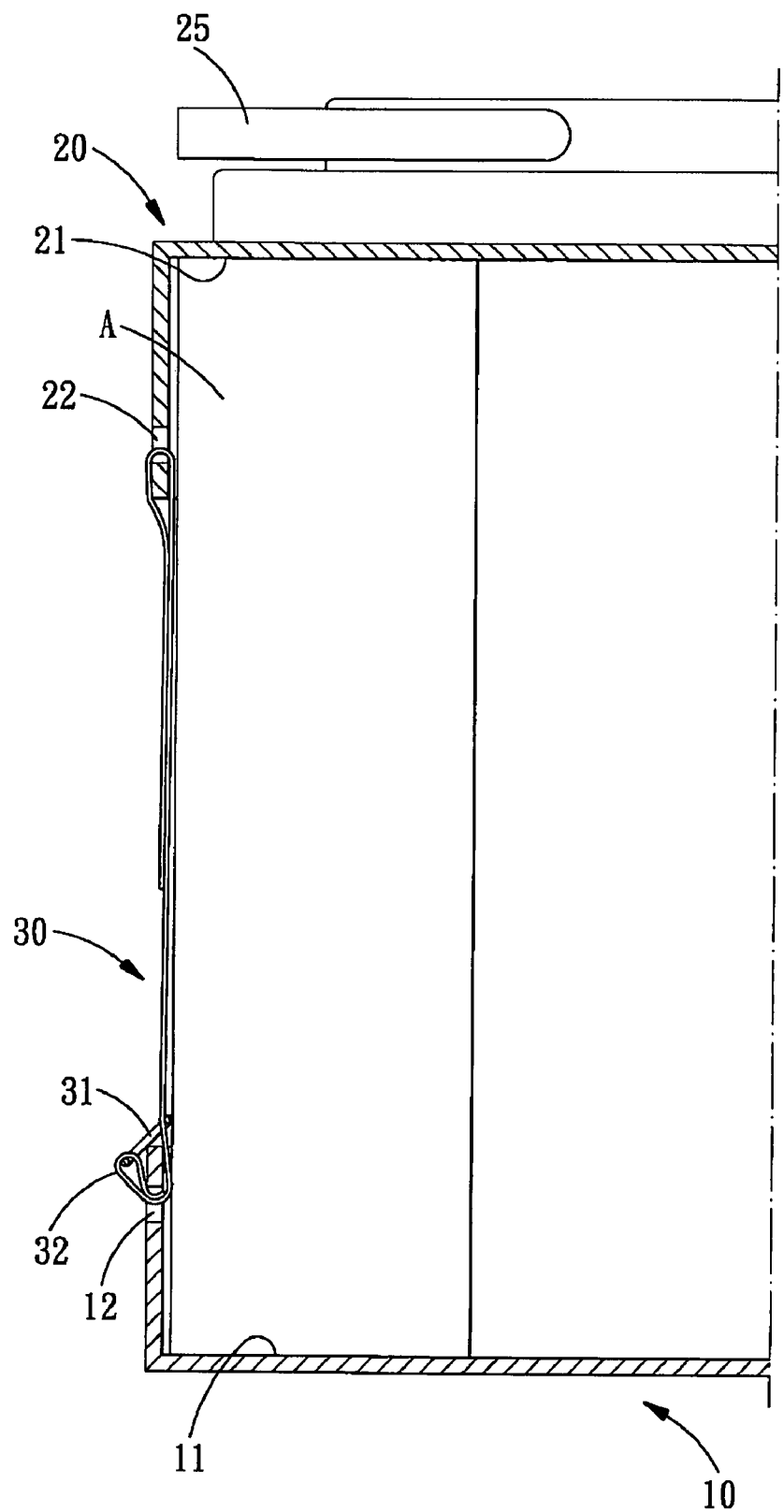
FIG. 3 is an assembly view of the frame structure for collecting a plurality of batteries in accordance with the present invention.

Referring to FIGS. 1-3, a frame structure for collecting a plurality of batteries in accordance with a first embodiment of the present invention comprises a base 10, a cover 20, and a plurality of jointing structures 30. The base 10 is provided for collecting the plurality of batteries A. The cover 20 covers one end surface of the batteries A with positive terminals A1 and negative terminals A2, and the positive terminals A1 and the negative terminals A2 of the batteries A are protruded out of one end of the cover 20. The jointing structures 30 are inserted through both sides of the base 10 and the cover 20. The base 10 cooperates with the cover 20 to collect the batteries A, and the jointing structures 30 are inserted through both sides of the base 10 and the cover 20, such that the present invention not only is portable and easy to disassemble, but also is environmental protection.

The base 10 is a rectangular-shaped insulator and is formed with a concave square-shaped containing portion 11 for collecting the batteries A. In addition, four rectangular-shaped penetrated portions 12 are defined in the lateral sides of the base 10 surrounding the containing portion 11, and the penetrated portions 12 are provided for insertion of the jointing structures 30, respectively.

The cover 20 is rectangular-shaped and includes a multi-layer covering portion 21 for covering the end surface of the batteries A with the positive terminals A1 and the negative terminals A2. Four rectangular-shaped penetrated portions 22 are defined in the lateral sides of the cover 20 surrounding the covering portion 21, and the penetrated portions 22 are provided for insertion of the jointing structures 30, respectively. Moreover, two circular-shaped penetrated portions 23 are defined in the top surface of the cover 20 and are provided for insertion of the positive terminal A1 and the negative terminal A2 of the battery assembly. Further, a rectangular-shaped top portion 24 is protrudly formed in a center of a free end of the cover 20, and on both sides of the top portion 24 are fastened two handles 25 for the user to carry.

Each jointing structure 30 is formed with a mounting portion 31 in the shape of a hollow rectangle. One end of the mounting portion 31 is provided for fixing one end of a strip-shaped positioning portion 32. One end surface of the positioning portion 32 is formed with a sticking portion 320, and the other end surface of the positioning portion 32 is formed with an adhesive portion 321. One end of the positioning portion 32 is passed through the mounting portion 31 after passing through the penetrated portion 12 of the base 10, and the other end of the positioning portion 32 is pulled toward the base 10 after inserting through the penetrated portion 22. And the sticking portion 320 and the adhesive portion 321 of the positioning portion 32 are stuck with each other.

Figure 4:
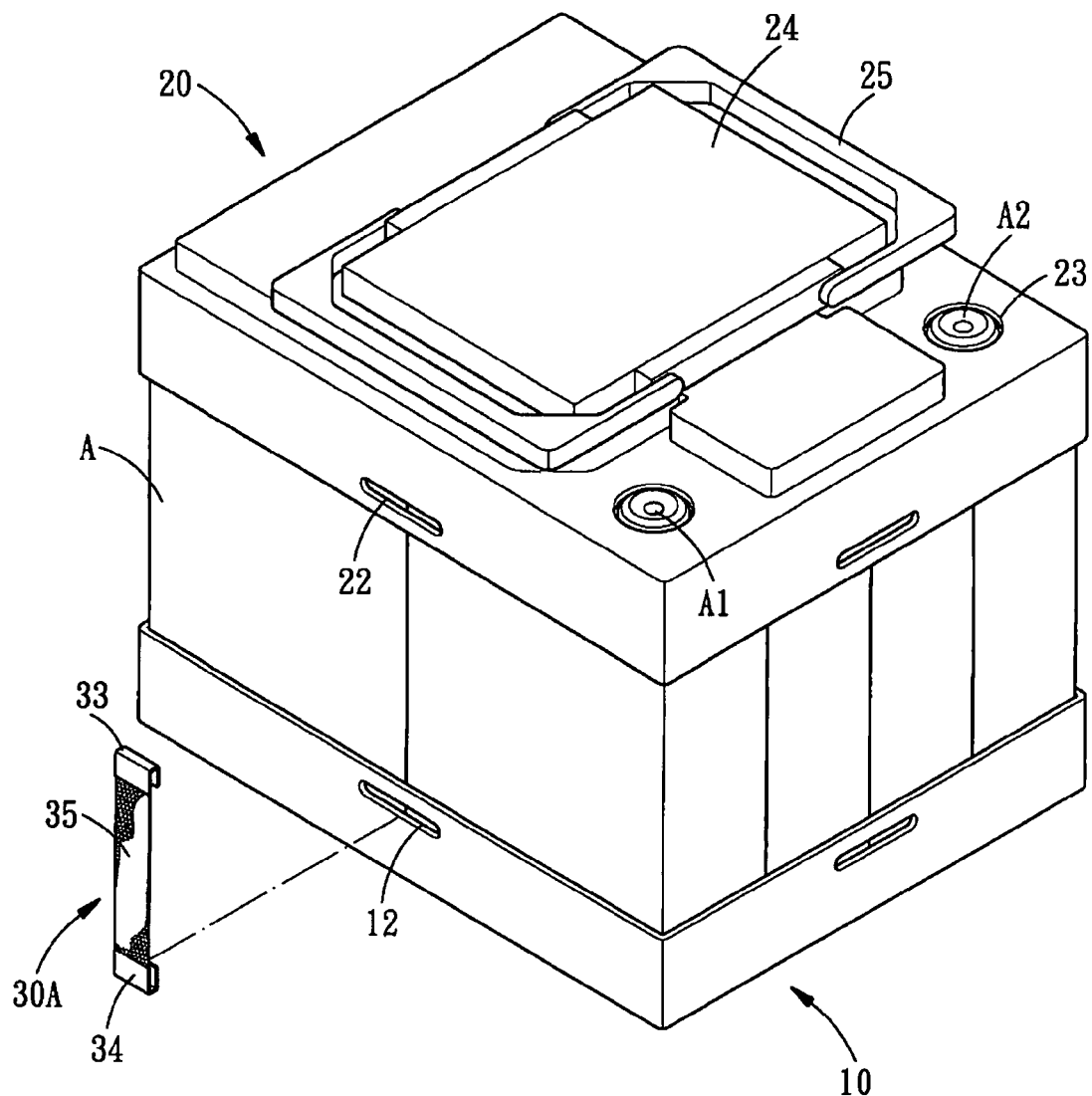
FIG. 4 is an illustrative view showing the frame structure for collecting a plurality of batteries in accordance with a second embodiment of the present invention.

Referring to FIG. 4, a frame structure for collecting a plurality of batteries in accordance with a second embodiment of the present invention is shown, a jointing structure 30A is formed with a reverse U-shaped hook portion 33 and a U-shaped fixing portion 34. An elastic extended portion 35 in the form of a strip-shaped cloth is fixed between one free end of the hook portion 33 and one free end of the fixing portion 34. The other free end of the hook portion 33 is hooked in the penetrated portion 12 of the base 10, and the other free end of the fixing portion 34 is inserted in the penetrated portion 22 of the cover 20. Since the jointing structure 30A is inserted through the penetrated portion 12 of the base 10 and the penetrated portion 22 of the cover 20, the batteries A can be collected and replaced easily.

Figure 5:
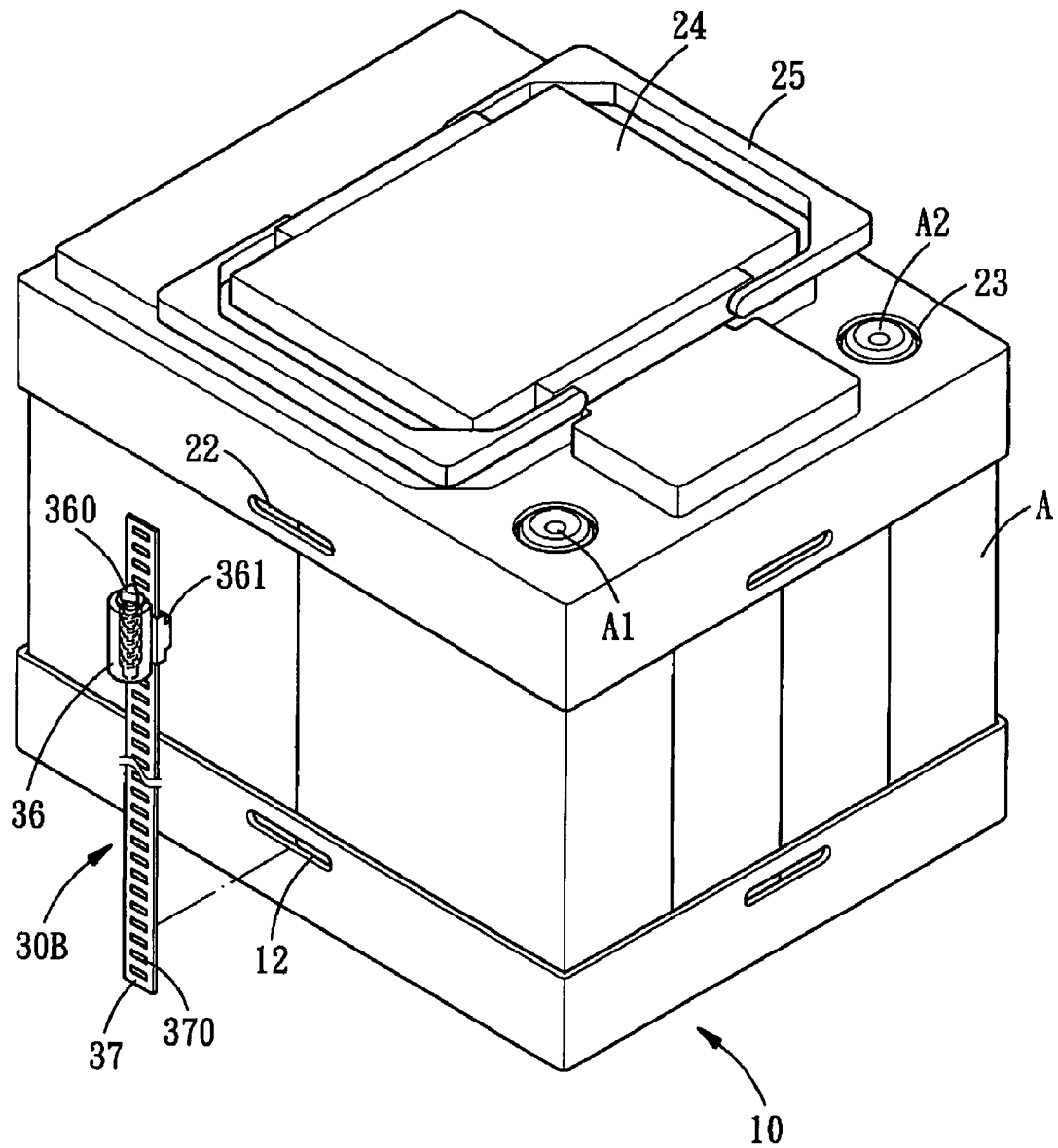
FIG. 5 is an illustrative view showing the frame structure for collecting a plurality of batteries in accordance with a third embodiment of the present invention.

Referring to FIG. 5, a frame structure for collecting a plurality of batteries in accordance with a third embodiment of the present invention is shown, a jointing structure 30B is a strip-shaped structure and includes a locking member 36 in the shape of a hollow cylinder and a strip-shaped strip member 37. A helical rotating member 360 is defined in the locking member 36. One end of the locking member 36 is formed with an inserting portion 361 in the shape of a hollow rectangle that is in communication with the rotating member 360. The strip member 37 is extended from a free end of the locking member 36 and is defined with a plurality of elongated locking portions 370. The strip member 37 is inserted in the inserting portion 361 of the locking member 36 after passing through the penetrated portion 12 of the base 10 and the penetrated portion 22 of the cover 20. And the rotating member 360 of the locking member 36 is locked with the locking portions 370 of the strip member 37. Thereby, with different positioning effects of the jointing structure 30B, the batteries A can be collected and replaced easily.

It is apparent from the above-mentioned descriptions that the present invention has the advantages described as follows:

Firstly, the base 10 and the cover 20 cooperate with the jointing structures 30 to collect the batteries A, so the structure of the present invention is simple.

Secondly, the base 10, the cover 20, and the jointing structures 30 are all made of insulating materials, and the cover 20 covers the positive terminals A1 and the negative terminals A2 of the batteries A, such that the present invention is secure.

Thirdly, the batteries A are collected between the base 10 and the cover 20, and the jointing structures 30 are inserted through the penetrated portion 12 of the base 10 and the penetrated portion 22 of the cover 20, so the present invention has a high stability.

Fourthly, the batteries A are collected between the base 10 and the cover 20, such that the object of wide industry application is achieved.

Fifthly, since the jointing structures 30, 30A, and 30B are easy to fix, the batteries A can be disassembled and replaced easily.

Sixthly, after the frame structure is assembled, the handles 25 disposed at both sides of the top portion 24 of the cover 20 facilitate the user to carry, so the present invention is portable.

While we have shown and described various embodiments in accordance with the present invention, it should be clear to those skilled in the art that further embodiments may be made without departing from the scope of the present invention.

What is claimed is:

1. A frame structure for collecting a plurality of batteries, comprising:
   a base having a concave containing portion for receiving one end of the respective batteries;
   a cover having a concave covering portion for covering another end of each of the batteries, one of positive terminals and one of negative terminals of the batteries being protruded out of the cover;
   a plurality of jointing structures, one end of each jointing structure being inserted through the base, and another end of each jointing structure being inserted through the cover;
   wherein four penetrated portions are defined in lateral sides of the base surrounding the containing portion, and the penetrated portions are provided for insertion of the jointing structures, respectively.

2. The frame structure for collecting a plurality of batteries as claimed in claim 1, wherein the covering portion covers the end of the batteries with the positive and negative terminals, four rectangular-shaped penetrated portions are defined in lateral sides of the cover surrounding the covering portion for insertion of the jointing structures, respectively, the cover is defined with two penetrated portions for insertion of positive and negative terminals of a battery assembly, and the cover is formed with a top portion that is provided with at least one handle for the user to carry.

3. The frame structure for collecting a plurality of batteries as claimed in claim 1, wherein each jointing structure is formed with a mounting portion in a shape of a hollow rectangle, one end of the mounting portion is fixed with a positioning portion, one end surface of the positioning portion is formed with a sticking portion, and another end surface of the positioning portion is formed with an adhesive portion.

4. The frame structure for collecting a plurality of batteries as claimed in claim 1, wherein each jointing structure is a strip-shaped structure and includes a locking member, a rotating member is defined in the locking member, one end of the locking member is formed with an inserting portion, a strip member is extended from a free end of the locking member and is defined with a plurality of locking portions, and the strip member is inserted in the inserting portion.

* * * * *